United States Patent [19]
Sainsbury

[11] Patent Number: 4,785,209
[45] Date of Patent: Nov. 15, 1988

[54] RECIPROCATING LIQUID METAL MAGNETOHYDRODYNAMIC GENERATOR

[76] Inventor: Garrett M. Sainsbury, 10 Waratah Ave., Dalkeith, Western Australia, Australia

[21] Appl. No.: 5,157
[22] PCT Filed: Apr. 16, 1986
[86] PCT No.: PCT/AU86/00101
§ 371 Date: Nov. 26, 1986
§ 102(e) Date: Nov. 26, 1986
[87] PCT Pub. No.: WO86/06225
PCT Pub. Date: Oct. 23, 1986

[30] Foreign Application Priority Data
Apr. 17, 1985 [AU] Australia .............................. PH00178

[51] Int. Cl.[4] ...................... H02K 44/00; G21D 7/02
[52] U.S. Cl. .................................................. 310/11
[58] Field of Search ........................................ 310/11

[56] References Cited
U.S. PATENT DOCUMENTS

| | | | |
|---|---|---|---|
| 3,102,224 | 8/1963 | Maeder | 310/11 X |
| 3,185,871 | 5/1965 | Bodine, Jr. | 310/11 |
| 3,286,108 | 11/1966 | Fouda-Bonardi | 310/11 |
| 3,350,584 | 10/1967 | Brocher et al. | 310/11 |
| 3,430,081 | 2/1969 | Zauderer | 310/11 |
| 3,453,462 | 7/1969 | Hsu et al. | 310/11 |
| 3,549,915 | 12/1970 | Prem | 310/11 |

*Primary Examiner*—Mark O. Budd
*Attorney, Agent, or Firm*—Harness, Dickey & Pierce

[57] ABSTRACT

A magnetohydrodynamic generator comprising a pair of primary chambers (1a and 1d) containing a quantity of conducting fluid comprising a liquid metal and heated by a heat source, the primary chambers (1a and 1d) are interconnected at their lower ends by a channel incorporating a magnetohydrodynamic cell, each primary chamber (1a and 1d) being connected to a separate source (42a and 42d) of gaseous working fluid through heat regenerator (31a and 31d), whereby said working fluid is injected into the working fluid at an intermediate position spaced from the lower end and below the level of the conducting fluid, said injection being commenced when the level of conducting fluid in the primary chamber (1a and 1d) approaches its maximum and during the descent of that level and said working fluid is exhausted from the primary chamber (1a and 1d) from above the level of the conducting fluid, means being provided to cool and compress the exhausted working fluid for subsequent injection into the primary chamber and said heat regenerator (31a and 31d) extracts heat from said exhausted working fluid and heats said working fluid prior to its injection into the primary chamber (1a and 1d).

16 Claims, 8 Drawing Sheets

RECIPROCATING LIQUID METAL MAGNETOHYDRODYNAMIC GENERATOR

THIS INVENTION relates to the conversion of thermal energy to electrical energy using the magnetohydrodynamic principle which eliminates the turbine or engine used in conventional conversion systems.

In MHD generators a conducting fluid is caused to flow through a channel placed between the poles of an electromagnet. An electric current is induced in the fluid at right angles to botht he direction of fluid flow and the magnetic flux and is utilized by an external load connected across electrodes placed in contact with the fluid.

Existing MHD generators are of various types.

1. Plasma

A fuel/air mixture seeded with an ionizing element is burned to produce a high temperature conducting gas mixture (plasma) which is expanded through the MHD channel. Plasmas' are relatively poor conductors, even at the high operating temperatures employed (typically about 3000° C.) and superconducting (magnets with flux densities up to 6T are required to boost output. Because of the high operating temperature and flux density, plasma generators can only be considered for large scale systems.

2. Liquid Metal

In this type the conducting fluid is a liquid metal used in conjunction with a seperate thermodynamic working fluid to move it through the MHD channel. As high temperatures are not required to impart conductivity to the fluid as is the case with plasma generators lower temperature heat sources and lower strength magnets can be utilized making these generators more suitable for small scale installations.

The two main types of such generators use a single phase or a two phase medium in the MHD channel.

Two Phase

The thermodynamic fluid is injected into hot liquid metal in a mixer ahead of the MHD channel. Combinations used or proposed are organic fluids and sodium-potassium eutectic mixtures for low temperature systems, water and tin for medium temperature systems, and helium and sodium or lithium for high temperature systems. The working fluid expands and the resultant two phase mixture of gas and liquid metal accelerates through the MHD channel producing electric power. From the MHD channel the mixture enters a nozzle where further acceleration occurs followed by separation of the components in a rotating separator. The metal passes through a diffuser which converts part of its kinetic energy to potential energy in the form of pressure sufficient to force it through the primary heat exchanger where it is reheated before returning to the mixer to continue the process.

From the separator the vapour or gas still at high temperature passes through a regenerator where a proportion of its sensible heat is transferred to the working fluid on route to the mixer. The partially cooled vapour or gas from the regenerator is then further cooled in a reject heat exchanger, vapour condensing to liquid which is pumped back to the mixer via the regenerator. In the case of a gaseous working fluid the cool gas from the reject heat exchanger is compressed and returned to the mixer via the regenerator.

The main problems with these forms of generators are that:
(a) The electrical output is in the form of direct current which is not easily converted to alternating current for general use because of the very low voltage and wide voltage and current swings.
(b) The MHD cell internal resistance losses are high due to the presence of non-conductive vapour or gas bubbles in the liquid metal and the high temperature of the liquid metal.
(c) The nozzle, separator and diffuser are sources of high losses.

Single Phase

One form of such a generator is described in U.S. Pat. No. 3,443,129 dated May 6th, 1969. It consists of a vertical U tube the limbs of which terminate in a tank, the tube and tank are filled with liquid metal. The liquid metal is heated at the bend of the U tube and a thermodynamic working fluid is injected into the metal at the base of one of the limbs. The working fluid vapourizes forming a two phase mixture which is less dense than the contents of the other limb and is thus forced upwards. The vapour and liquid metal separate in the tank whereby the vapour is then condensed and returned as liquid to the base of the first limb and the liquid metal runs into the second limb to maintain circulation.

A MHD channel forms part of the second limb and converts the potential energy of the liquid metal in the tank to electrical energy. Because the fluid flowing in the MHD channel is single phase (i.e. liquid metal only), some of the problems of the two phase form such as large current and voltage swings are avoided. Also, the absence of vapour bubbles reduces the MHD cell internal resistance losses and the higher conductivity of the fluid in the cell allows the use of less powerful magnets. Furthermore, the high loss nozzle, separator and diffuser are eliminated.

Nevertheless, certain technical and economic problems remain and other problems are introduced which include:
(a) The electrical output is in the form of a very low voltage direct current.
(b) MHD cell internal resistance losses increase as the temperature of the liquid metal increases.
(c) Bubble slip relative to the liquid metal reduces efficiency.
(d) A large mass of expensive liquid metal is needed.
(e) The plant is very bulky.

One of the main draw backs of the above systems is that they all produce low voltage direct current which must be converted to high voltage alternating current for transmission and general use and this introduces further complexities and losses.

U.S. Pat. No. 3,376,440 dated Apr. 2, 1968 discloses a means of producing an alternating current by maintaining a constant magnetic field and causing the liquid metal to periodically change its direction of flow through the MHD channel. This is effected by means of two closed vertical cylinders connected at the bottom by a horizontal pipe incorporating a MHD cell. The cylinders are partially filled with liquid potassium which acts as the conducting fluid. The primary heat source is nuclear and a primary heat exchanger is provided to vapourize potassium which is the thermodynamic working fluid. A reject heat exchanger is provided to condense the vapour. In operation high pressure potassium vapour from the primary heat exchanger is piped to the cylinders where it is admitted to one of them above the liquid potassium level through an inlet valve. At the same time an exhaust valve in the second cylinder is opened. This causes the liquid potassium to be forced from the first cylinder through the MHD channel to the second cylinder generating a current in one direction. The vapour exhausted from the second cylinder is piped to the reject heat exchanger where it is condensed to liquid and pumped back to the primary heat exchanger for reheating. Movement of the liquid metal is stopped by the head of the second cylinder where upon the inlet valve on the first cylinder is shut and the exhaust valve on the second cylinder is also shut. At the same time an inlet valve on the second cylinder is opened and an exhaust valve on the first cylinder is also opened, causing the liquid potassium to be forced back through the MHD channel in the reverse direction. This cycle is repeated continuously resulting in the generation of an alternating current.

It is believed that a problem with this approach resides in the condensation of much of the potassium vapour by contact with the cold liquid and wet walls of the cylinder before it could do any useful work. This results in a low thermodynamic efficiency. Further losses if not damage would occur due to the momentum of the liquid metal being dissipated by abrupt contact with the cylinder heads at the end of each stroke. Also, mechanical problems could be expected from the inlet and exhaust valves operating in an atmosphere of hot potassium vapour.

The object of this invention is to provide a simple reliable and inexpensive means of converting thermal energy to electrical energy at high rates and at high efficiency and which is able to utilize thermal energy from any medium to high grade source.

This is achieved by operating a single phase liquid metal MHD generator according to the general principles of the Stirling thermodynamic cycle.

The Stirling cycle is efficient and in principle its mechanical implementation is very simple. In its basic form two cylinders are provided which are each equipped with a piston connected to a common crank shaft, the cranks being 90° out of phase. The cylinders contain between them a fixed mass of gas which is free to move between the cylinders via a connecting pipe. One cylinder is kept hot and the other is kept cold. As the crankshaft revolves the volume of the space between the piston heads cyclically increases and decreases and the gas alternatively expands and contracts. Because of the disposition of the cranks the bulk of the gas is in the hot cylinder when expansion commences and the pressure is correspondingly high. Conversely the bulk of the gas is in the cold cylinder when compression commences and the pressure is correspondingly low. Work is the product of the change in volume and the pressure at which the change occurs. As the average pressure is higher during the expansive change of volume than it is during the compressive change of volume, net positive work is performed during a complete cycle which is equivalent to the difference between the heat added to the hot cylinder and the heat rejected from the cold cylinder.

To improve the thermodynamic efficiency a regenerator is placed in the gas line connecting the two cylinders which absorbs heat from the hot gas as it is moving from the hot cylinder to the cold cylinder and returns it to the cold gas as it is moving from the cold cylinder to the hot cylinder.

In practice certain difficulties arise with the above arrangement which are mainly related to the problem of transferring heat to and from the working gas via external heat exchangers at an acceptable rate. This process which controls the rate of performing work (i.e. the power of the engine).

In one form the invention resides in a magnetohydrodynamic generator comprising a pair of chambers containing a quantity of conducting fluid comprising a liquid metal and heated by a heat source, the chambers are interconnected at their lower ends by a channel incorporating a magnetohydrodynamic cell, each chamber being connected to a separate source of gaseous working fluid whereby said working fluid can be injected into the conducting fluid in a chamber at an intermediate position in the chamber spaced from said lower end when the one chamber contains a maximum volume of conducting fluid and the working fluid can be exhausted from the chamber said exhausted working fluid being cooled in a heat regenerator and compressed for reinjection into the chamber wherein the compressed working fluid is heated in the heat regenerator prior to injection wherein the injection of working fluid into the chambers of a pair of chambers is approximately 180° out of phase.

A particular embodiment of the invention will now be described for the purpose of illustration of the invention with reference to the accompanying schematic drawings. The features of the embodiment described are not intended to be limiting on the scope of the invention. The drawings comprise.

The embodiment comprises a magnetohydrodynamic generator which utilises liquid metal as the conducting fluid and an inert gas as the thermodynamic working fluid. The generator comprises a set of two pairs of cylindrical primary chambers 1a and 1d, 1b and 1c whereby the primary chambers of each pair are interconnected by a magnetohydrodynamic channel 78 extending between the lower ends of the respective pair of chambers. Each pair of primary chambers contains a quantity of liquid metal which is caused to flow therebetween through the magnetohydrodynamic channel 78. The four primary chambers are accommodated in a combustion chamber 2 having a fuel injection nozzle 18 and forced air inlet opening 16 therein. Exhaust from the combustion chamber 2 is effected through fire tubes 5 which extend through each of the primary chambers and between the bottom and top thereof. The top of each primary chamber has a header 8 which opens into an exhaust duct 9. The exhaust ducts 9 pass to an air preheater 10 for the combustion chamber which comprises a space 14 through which a series of air tubes 13 pass between the air inlet and outlet of the preheater. Air is supplied to the preheater from a fan 12 and the preheated air is passed to the air inlet opening 16 in the combustion chamber through an air inlet duct 15. In the case of the embodiment the fuel used is of a liquid form and is supplied from a fuel tank 20 through filters 21 and a heater 22 which is in heat exchange relationship with the exhaust gases from the combustion chamber 2. It should be appreciated however that the fuel injector nozzle 18 can be readily replaced or modified by or to one suitable for use with gaseous and/or solid particulate fuel. Alternatively the combustion chamber may be replaced by some other energy source such as a solar collector, a geothermal collector, or a nuclear heated heat exchanger or the like.

Each of the primary chambers 1a, b, c and d are connected to heat regenerators 31a, 31b, 31c and 31d respectively which comprise chambers filled with a mesh of fine wires formed of a thermally conductive material. The interconnection between the primary chambers 1a, 1b, 1c and 1d and the regenerators 31a, 31b, 31c and 31d respectively is effected by exhaust lines 24a, 24b, 24c and 24d and inlet lines 23a, 23b, 23c and 23d respectively. The connection of each exhaust line 24 with the respective primary chamber is effected through an anti-splash barrier 32. The inlet lines 23 connect with injection heads 33 mounted in the primary chambers and intermediate the bottom and top thereof. Each injection head 33 comprises a plurality of radial perforated arms connected to the respective inlet line through a central boss. One way valves 58a, b, c and d are provided in teh exhaust lines 24a, 24b, 24c and 24d respectively to ensure unidirectional flow from the respective primary chambers and similarly one way valves 57a, 57b, 57c and 57d are provided in the inlet lines 23a, 23b, 23c and 23d respectively to ensure unidirectional flow to the respective primary chambers 1.

Each primary chamber 1a, 1b, 1c and 1d is associated with a secondary chamber 42a, 42b, 42c and 42d respectively. The primary chambers 1 and secondary chambers 42 are interconnected through the heat regenerators 31. Secondary inlet lines 35a, 35b, 35c and 35d are provided between the second chambers 42a, 42b, 42c and 42d respectively and the respective heat regenerator 31. One way valves 56a, 56b, 56c and 56d are provided in the respective secondary line to ensure unidirectional fluid flow to the secondary chamber 42 from the respective heat regenerator 31. Secondary exhaust lines 34a, 34b, 34c and 34d are provided between the secondary chamber 42a, 42b, 42c and 42d and the respective heat regenerators 31. One way valves 55a, 55b, 55c and 55d are located in the respective secondary line to ensure unidirectional fluid from the secondary chamber 42 to the heat regenerators 31.

Each secondary chamber 42 contains a quantity of heat exchange fluid which may or may not be of the same as that contained in the primary chambers. The secondary inlet pipes 35 open into the secondary chambers 42 below the liquid level in the chamber. In addition the entry of the secondary exhaust pipes 34 in the secondary chambers 42 are provided with splash barriers similar to the splash barriers 32 provided in the primary chambers 1. Each secondary chamber 42a, b, c and d is associated with a tertiary chamber 44a, b, c and d respectively. Each tertiary chamber slidably supports a piston 43a, b, c and d respectively which facilitates a variation in volume in the tertiary chambers 44a, b, c and d respectively. The tertiary chambers 44 contain the same heat exchange fluid as the secondary chambers and are interconnected with the respective secondary chamber by lines extending between the lower end of each chamber and incorporating non return valves 46a, b, c and d respectively which ensure unidirectional flow from the second chambers 42 to the respective tertiary chambers 44. A further line interconnects each secondary chamber 42 with its respective tertiary chamber and incorporates a one way valve 45a, b, c and d respectively which ensures unidirectional flow from the tertiary chambers 44 to its respective secondary chamber 42. The further line extends between the lower end of the tertiary chamber 43 and the space in the respective secondary chamber intermediate the maximum and minimum level of the heat exchange fluid in the secondary chamber. Spray heads 54 are provided on the outlet of the lines in the secondary chamber.

Each portion of the secondary chamber 42 accommodating the heat exchange fluid is provided with a heat exchange coil 76 which is connected to radiators 77 to facilitate cooling of the conducting fluid in the secondary chamber 42.

The pistons 43 are caused to reciprocate through a pair of crankshafts 65 and 66 driven from a common drive motor 72. One crankshaft 65 drives the pistons 43b and 43a of the tertiary chambers 44b and 44a which are associated with one of the primary chambers 1b and 1a of each pair of chambers and similarly the other crankshaft 66 operates the pistons 43c and 43d of the other tertiary chambers associated with the other primary chambers 1 of each pair of primary chambers. The pistons in the tertiary chambers associated with each pair of primary chambers are 180° out of phase with each other and the pistons driven by each crankshaft are 90° out of phase with each other.

The space of the primary and secondary chambers 1 and 42 not occupied by the conducting fluid together with the free space in the heat regenerators 31 constitutes the working space of the engine and is filled with a working fluid comprising an inert gas such as helium. The surface of the conducting fluid in the secondary chambers 42 rises and falls under the influence of the movement of the pistons 43 in the tertiary chambers 44 whereby cooled conducting fluid is drawn from the secondary chambers 42 into the tertiary chambers 44 and is injected into the secondary chambers 42 through the spray heads which are located at an intermediate position in the secondary chambers between the lowest and highest level of conducting fluid in the chamber.

In operation assuming no losses in the magnetohydrodynamic channel 78, due to friction or electromagnetic loads, and if it is taken that in one pair of primary chambers 1a and 1d the levels of the conducting fluid therein are at their highest and lowest volumes respectively the volume of the space in the respective tertiary chambers 44a and 44d are at their maximum and minimum levels respectively. The movement of heat exchange fluid into the one secondary chamber 42a with the decrease in volume of the one tertiary chamber 44 causes the working fluid in the one secondary chamber 42a to be exhausted to the heat one regenerator 31a where the fluid absorbs heat and then passes to the inlet line 23a and injector 33 of the one primary chamber 1a where it is caused to bubble through the upper portion of the conducting fluid therein to undergo substantially isothermal expansion. The resultant increase in gaseous pressure above the conducting fluid in the one primary chamber 1a causes the conducting fluid therein to be forced into the other primary chamber through the magnetic hydrodynamic channel 78. This movement of the conducting fluid causes the working fluid in the other primary chamber 1d to be exhausted therefrom through the other heat regenerator 31d where much of its sensible heat is extracted and injected into the cool conducting liquid in the other secondary chamber 42d where the balance of its heat is dissipated. This movement of working fluid into the other secondary chamber 42d is accommodated by the movement of the other piston 43d in the other tertiary chamber 44d. This continues until the level of the conducting fluid in the one and other primary chambers 1a and 1d is at its minimum and maximum respectively. With contraction of the volume the other tertiary chamber 44d due to the down stroke of the other piston 43d the direction of flow of the conducting fluid in the magnetohydrodynamic channel 78 is reversed. This reciprocating flow will continue while heat is being produced at the combustion chamber. A reciprocating flow pattern in the magnetohydrodynamic channel 78 will produce an AC current at the magnetohydrodynamic cell.

In reality the load induced in the magnetohydrodynamic channel 78 leads to a lag in the movement of the conducting fluid in the primary chambers 1a and 1d and the reciprocation of the pistons 43a and 43d and thus the flow of conducting fluid between the respective secondary and tertiary chambers, whereby at about 90° lag the maximum work is being done of which a portion is supplied for the engine requirements and the remainder is available for external utilisation. In isolation and under full load conditions the gaseous pressure of the working fluid available in the working space of a primary chamber when the chamber contains the maximum volume of conducting fluid is insufficient to overcome the retarding forces induced on the flow of conducting fluid in the magnetohydrodynamic channel 78 and elsewhere. On the other hand at an intermediate point in the flow of conducting fluid through the magnetohydrodynamic channel between the primary chambers, the gaseous pressure is far in excess of that required to produce the desired velocity of flow through the magnetohydrodynamic channel 78.

Figure 6:
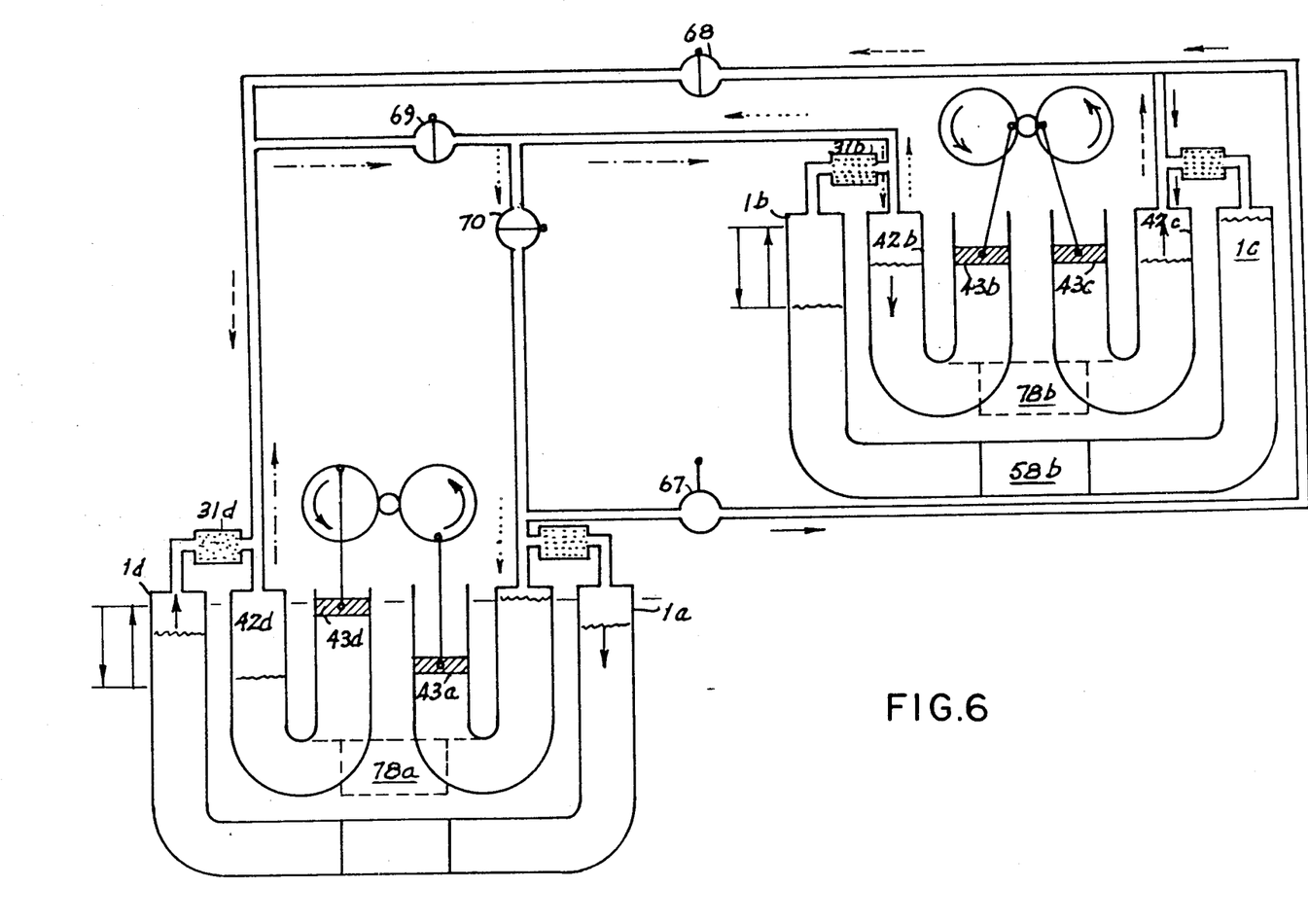
FIG. 6 which shows the arrangement for distributing gas between the working spaces and also the disposition of the pumping MHD units which are an alternative to the mechanical pumping arrangement.
Figure 7:
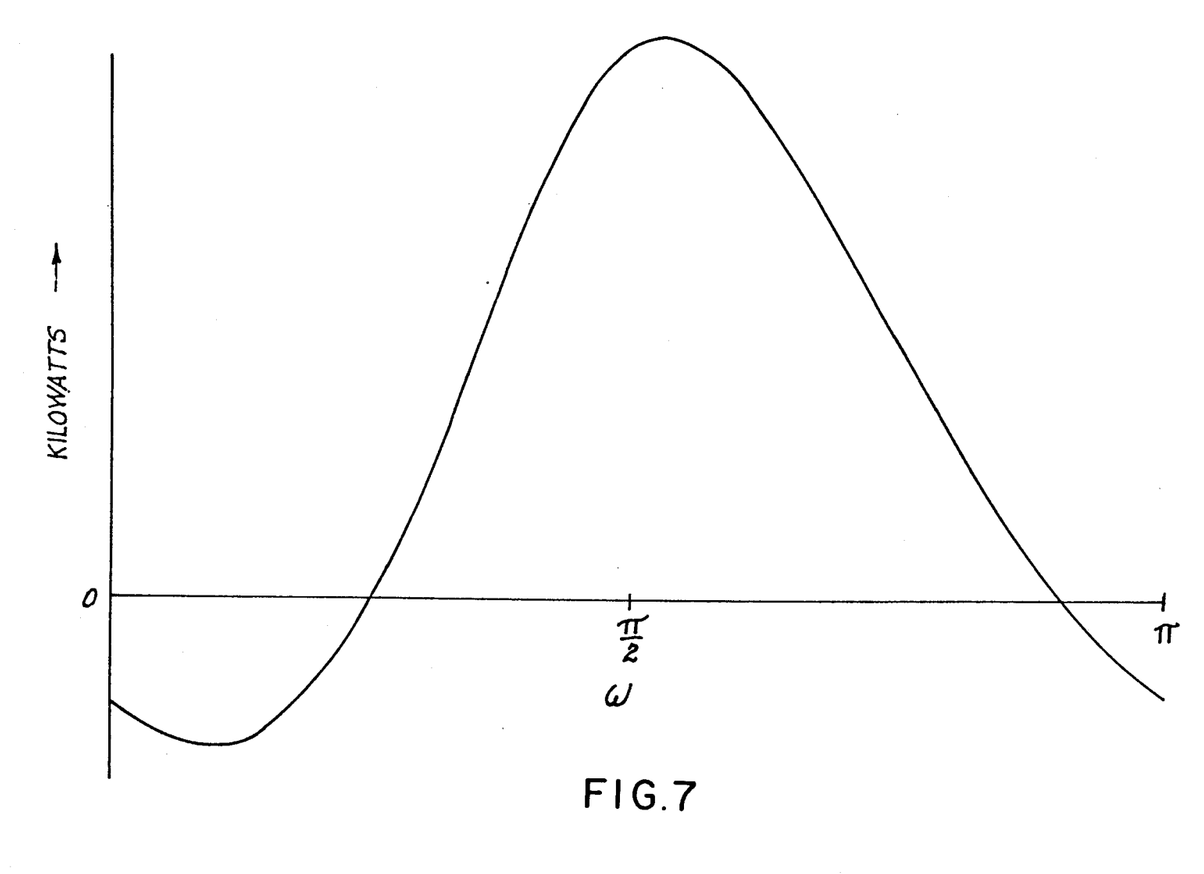
FIG. 7 is a gross power curve showing the gross power available from a pair of primary chambers.

It is for this reason that two pairs of interconnected primary chambers are provided. The operation of one pair is approximately 90° out of phase with the other pair whereby when one of the primary chambers of one of the pairs has the lowest gaseous pressure in its working space, the gaseous pressure in a primary chamber of the other pair is at its maximum. To assist the commencement of a downstroke cycle in one primary chamber, a fluid line is provided between the primary chambers of one pair and the primary chambers of the other pair. The flow of working fluid between the primary chambers is controlled through one way pressure differential valves 67, 68, 69 and 70 which will only open on a predetermined pressure differential existing between the primary chambers (see FIG. 6). The opening pressure of the pressure differential valves 67, 68, 69 and 70 may be adjustable through the operation of a cam shaft 71 according to the operational requirements of the engine. The interconnection between the primary chambers of each pair through the pressure differential valves is such that on the working space of a primary chamber developing a predetermined pressure during its downstroke, working fluid is bled therefrom to maintain that predetermined pressure in that primary chamber. The working fluid which is bled off is introduced into the primary chamber having the minimum gaseous pressure to facilitate commencement of the downstroke therein. This flow of working fluid between the primary chambers of each pair ensures a sinusoidal variation in the velocity of the flow of conducting fluid through the magnetohydrodynamic channels 78.

Figure 1:
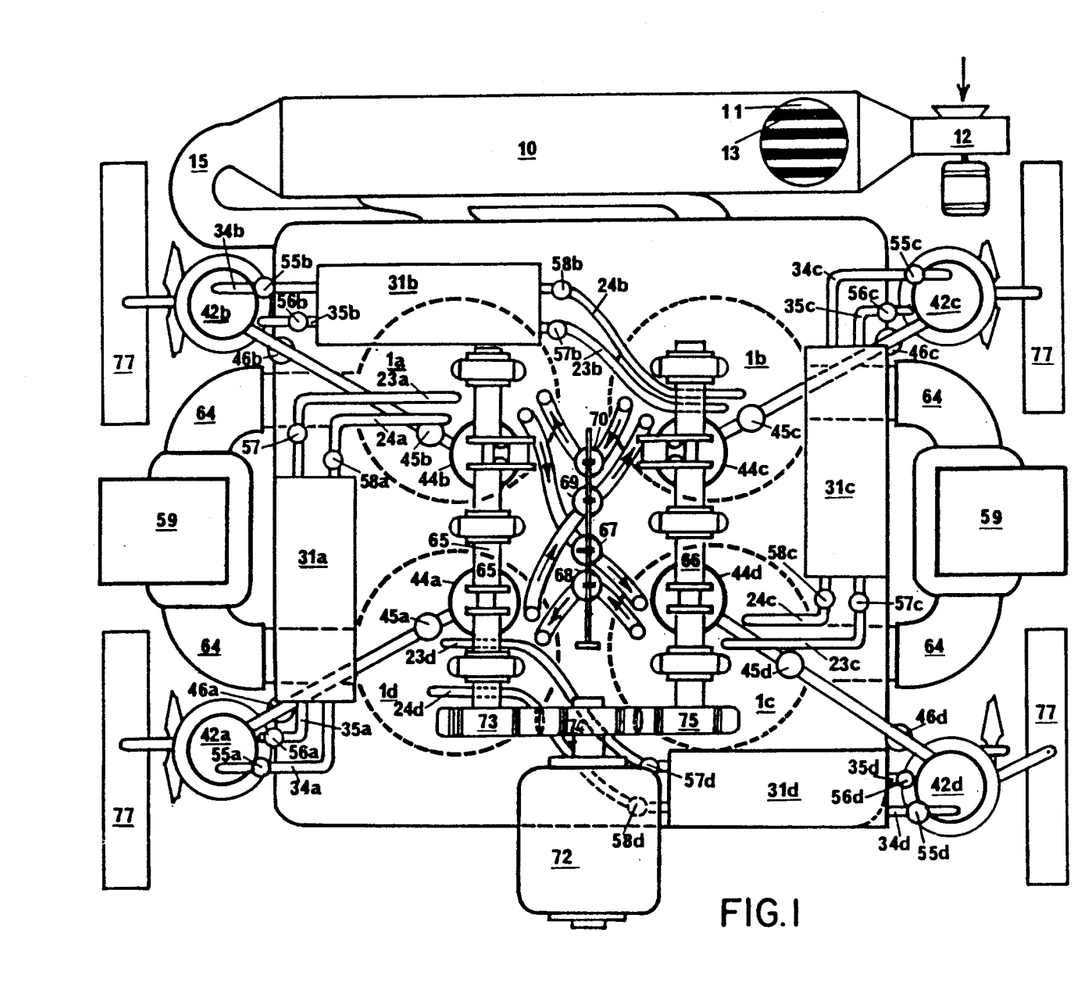
FIG. 1 which is a plan view of the device showing the general disposition of the main components.
Figure 2:
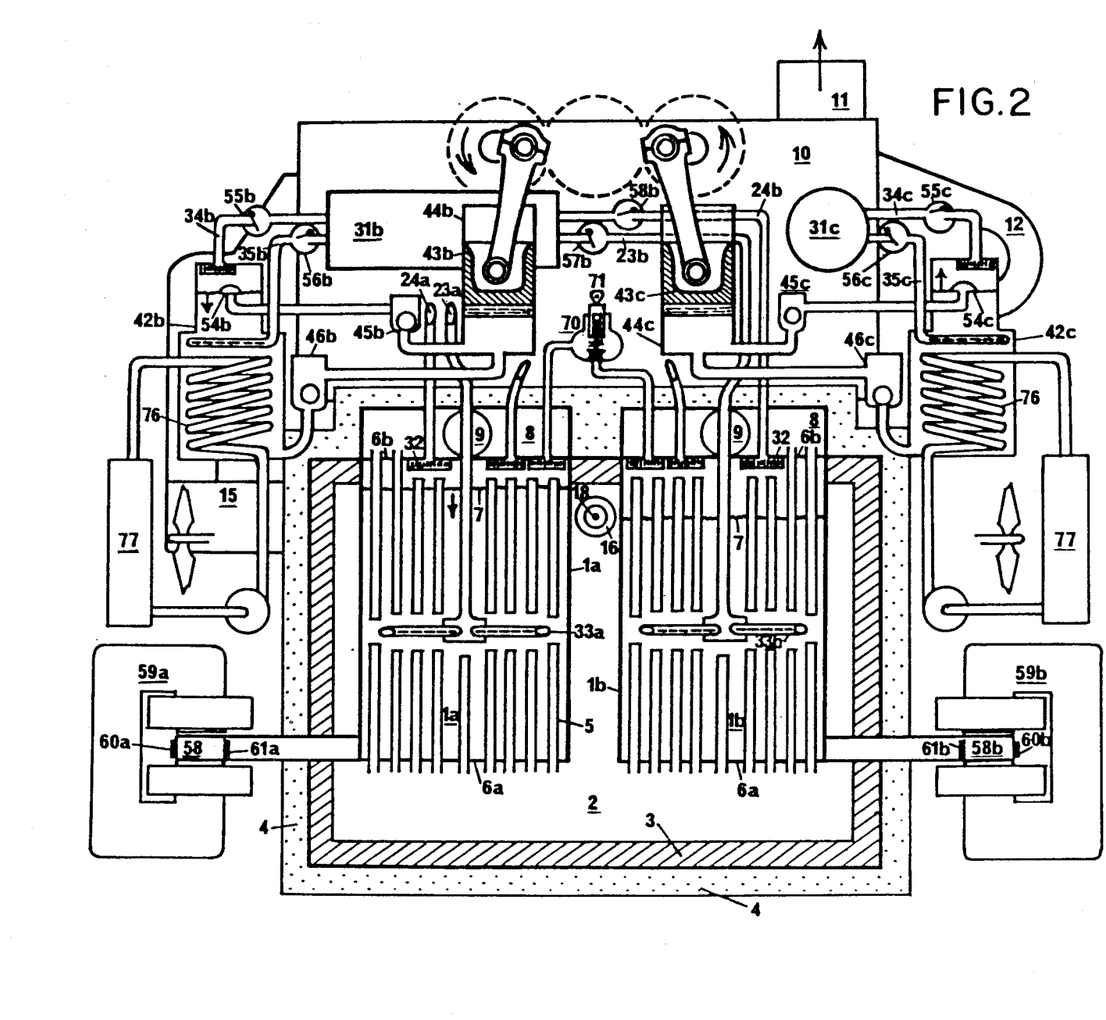
FIG. 2 which is a vertical section showing the arrangement of components forming two of four units of working space.
Figure 3:
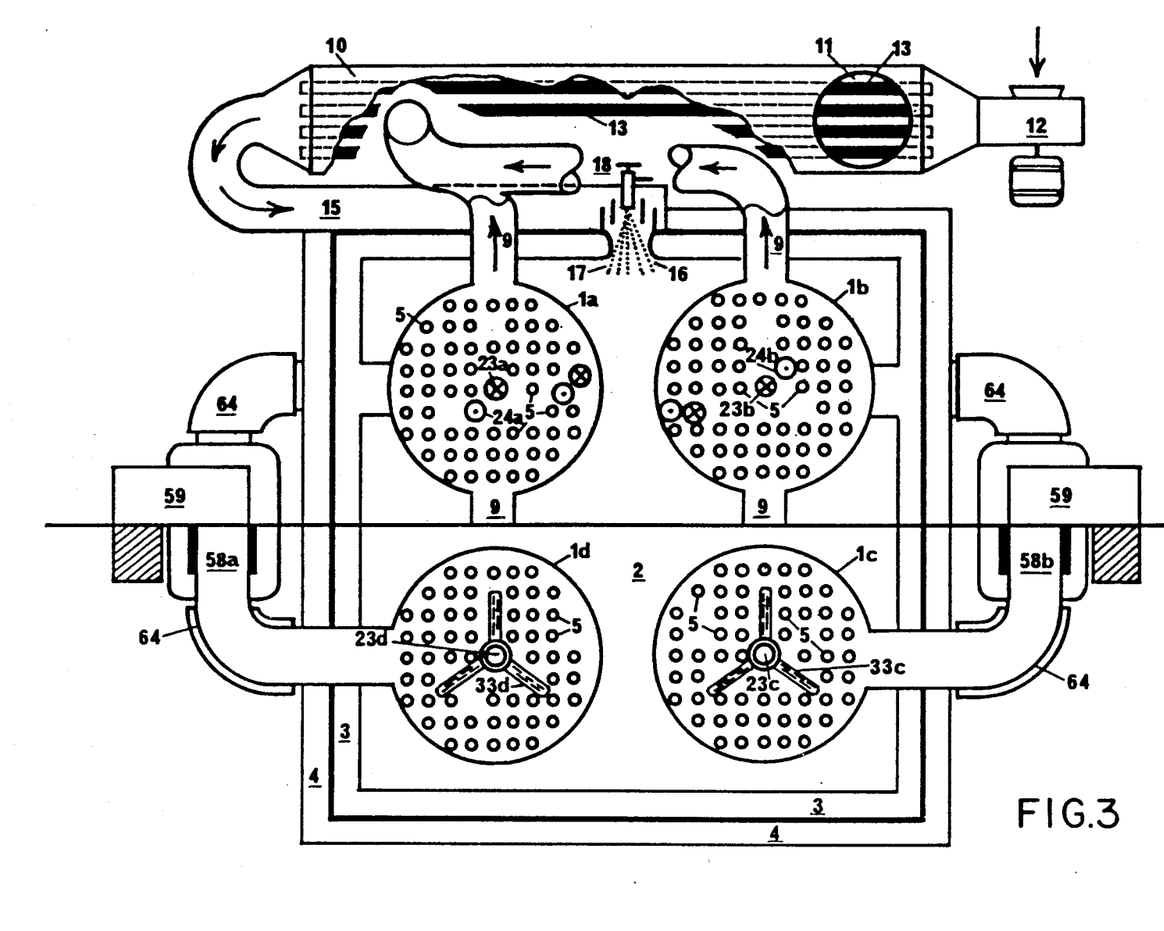
FIG. 3 which is a composite of several horizontal sections.
Figure 4:
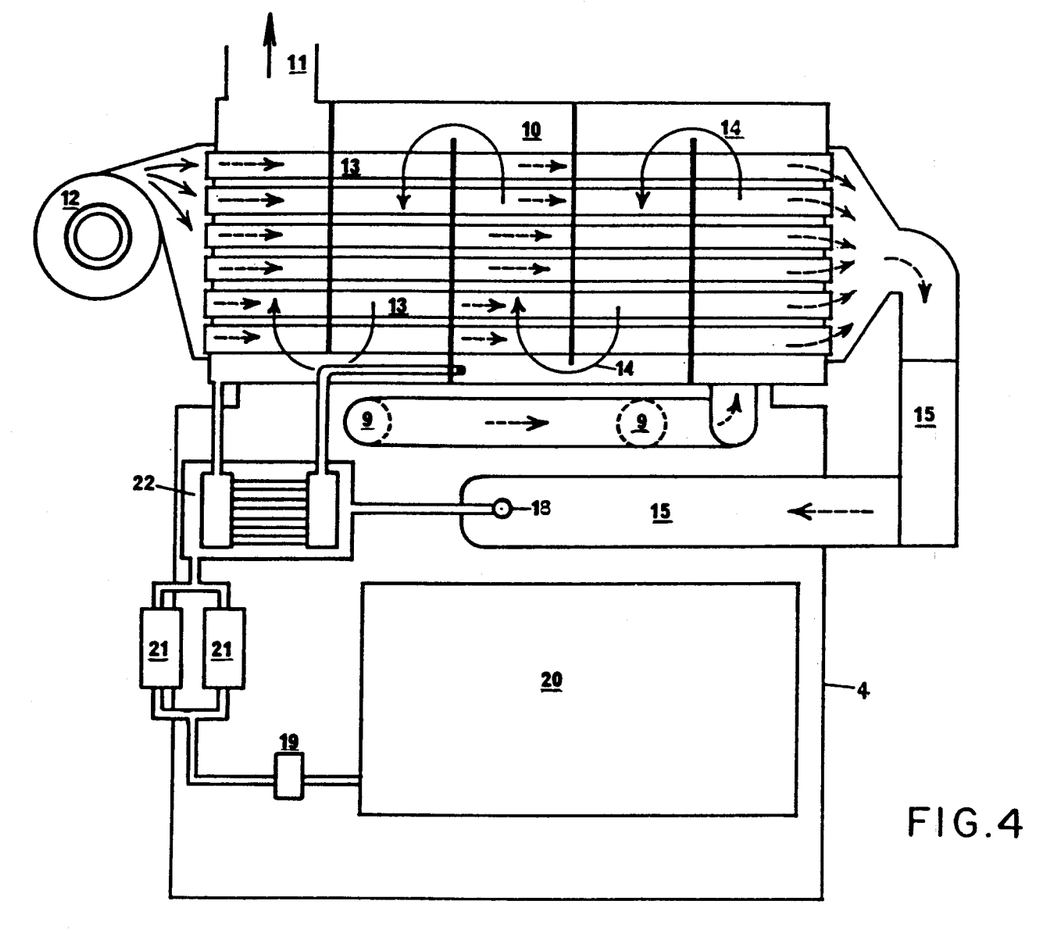
FIG. 4 which is a view of one side showing some of the components of the combustion system.
Figure 5:
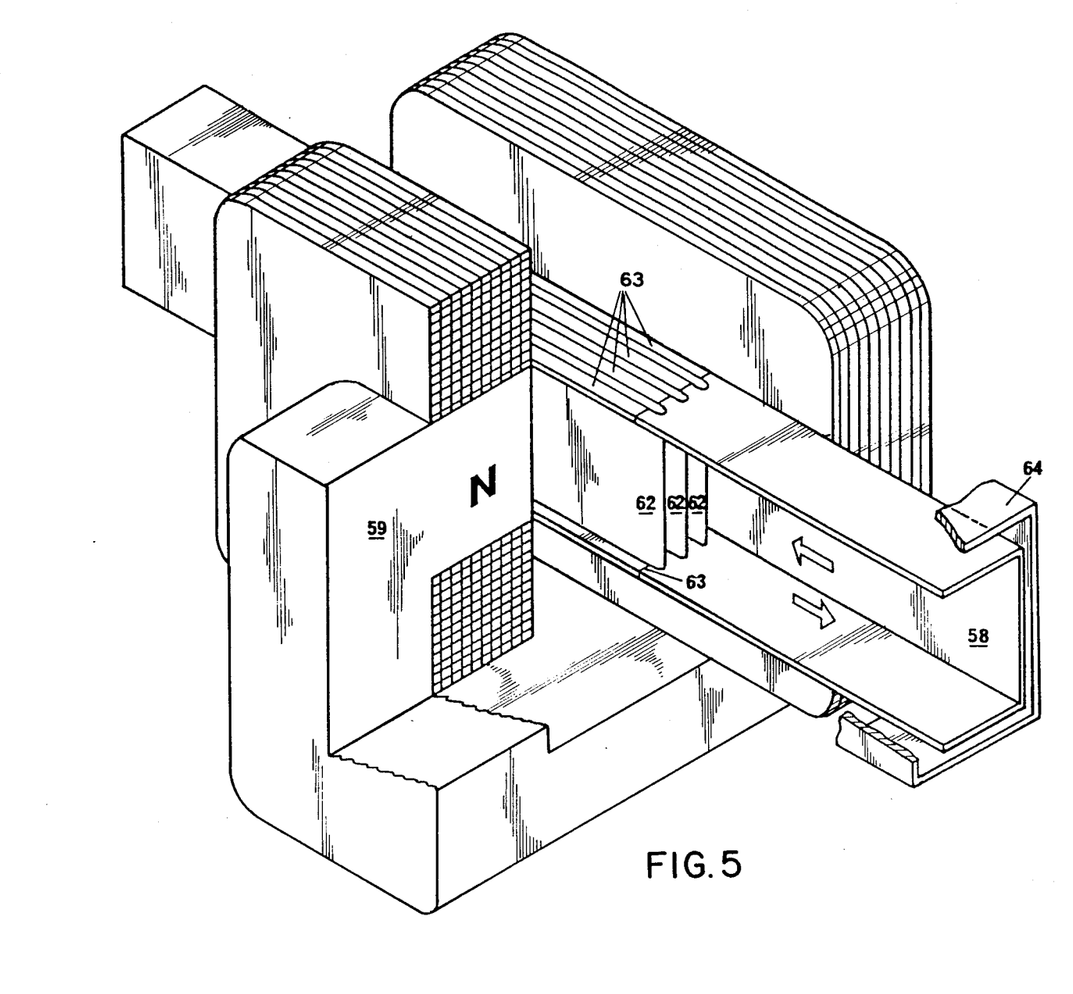
FIG. 5 which is an isometric section of one form of a MHD channel of the embodiment.
Figure 8:
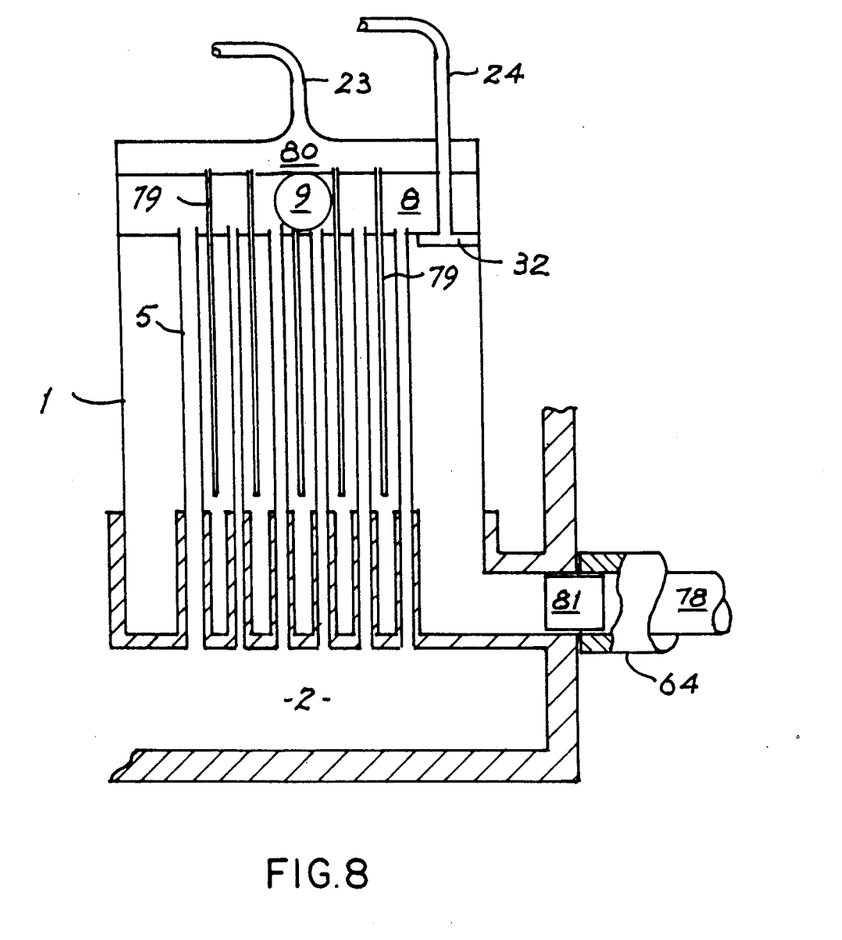
FIG. 8 is a part sectional elevation of a form of the lower end of the primary chamber.

As shown at FIG. 2 the magnetohydrodynamic channel 78 is associated with an electromagnet 59 having poles located to each side of the channel. The flow of the conducting fluid through the channel 78 is perpendicular to the magnetic field of the electromagnet. In addition a pair of electrodes 60 and 61 are located on the free sides of the channel in the region of the field produced by the coil 59. The flow of the conducting fluid through the field of the electromagnet 59 induces an e.m.f. between the electrodes 60 and 61. According to the form of the magnetohydrodynamic channel shown at FIG. 5 the channel may be modified by subdividing the channel with partitions 62 which are perpendicular to the field of the electromagnet and parallel to the flow of the fluid. The partitions are formed of a material having high magnetic permeability and are coated to be electrically insulated from the conducting fluid. If desired the partitions may be permanently magnetised. The passageways defined by the partitions are each associated with a pair of electrodes 63 which are in contact with the conducting fluid. As a result each passageway becomes a separate magnetohydrodynamic cell. By connecting the pairs of electrodes 63 in series a higher voltage valve can be derived than by using one pair of large electrodes. This higher voltage is at the expense of the higher internal resistance in the conducting fluid. To reduce this resistance the conducting medium can be cooled in the magnetohydrodynamic channel 78 by means of a cooling jacket 64 around the channel to each side of the electromagnetic coil. In addition to minimize heat loss the lower end of each primary chamber 1 and the fire tubes 65 may be insulated from the combustion chamber by use of refactories to restrain heating of the lower portion of the conducting fluid in the primary chambers (as shown at FIG. 8). To further minimize heat loss, hollow evacuated cylinders 81 in FIG. 8 can be placed in the straight sections of the ducts leading to each magnetohydrodynamic cell. These will act as an impediment to heat flow from the hot metal in the containers 1 to the cooler metal in the MHD channels while being free to oscillate over the stroke distance, transmitting forces from one side to the other. Lubrication would be effected by a film of liquid metal. If the liquid metal was sodium or lithium preheating at start up would be required by circulating a heating fluid through jacket 64. If the liquid metal was a NaK eutectic mixture liquid at room temperature preheating would not be necessary. This is shown schematically in FIG. 8 together with an arrangement for injecting the thermodynamic working fluid into the liquid metal.

If desired the tertiary chambers 44 and associated pistons could be replaced by secondary magnetohydrodynamic channels 78a and 78b (see FIG. 6) between the secondary chambers 42 of a pair of primary chambers 1. By applying alternating electrical power to the electrodes of the secondary magnetohydrodynamic generator they will act as pumps causing the conducting fluid to reciprocate between the secondary chambers in the required manner.

The above embodiment avoids several significant problems associated with the prior art referred to above including:

1. A commercially acceptable AC supply can be produced with the minimum of conditioning. The open circuit MHD cell voltage is higher than usual as a result of the subdivision the MHD channel into a number of subcells by partitions of high magnetic permeability or permanently magnetized material placed at right angles to the lines of magnetic force.

Also, because of the low mass density of the oscillating columns of liquid metal in the primary chamber (lithium, sodium, or a NaK eutectic mixture) the working fluid will cycle at 25–30 cycles per second under normal pressure differentials provided the absolute mass is not excessive. Conditioning can readily increase this output to commercial frequencies resulting in a 25 volt three phase 50–60 cycle output with a sinusoidal voltage wave form which can be boosted in a transformer to any final voltage level required.

2. MHD cell internal resistance losses are reduced by cooling the liquid metal in the cell to a temperature not much above its melting point, consistent with maintaining a reasonably low viscosity. This option is not available with existing MHD generators with unidirectional flow. End effect (i.e. eddy current) and wetting film losses still occur but the former can be minimized by laminating the flow at the approaches to the channel by partitions parallel to the magnetic field and the latter is not a source of serious loss.

3. Gas and liquid flow rates are moderate resulting in low friction and separation losses and there are no high loss components as in two phase devices.

4. Bubble slip is not a source of loss.

5. Only small quantities of liquid metal are required reducing expense especially if sodium is the principal metal as it is the cheapest of all metals on a volume basis. A potassium-sodium eutectic mixture which is liquid at room temperature is proposed for use in the cold columns but the NaK mixture could be replaced by a suitable non metallic heat transfer fluid provided extra precautions were taken to ensure that none was carried into the heat regenerator and beyond. If a non-metallic heat transfer fluid was used the option of using MHD units as pumps would be lost.

6. As the thermodynamic working fluid is one of the noble gases, (preferably helium because of its relatively good thermal conductivity), losses due to condensation of the working fluid in contact with the liquid metal do not occur.

7. Energy expended in accelerating the liquid metal columns in the first half of their stroke is fully recovered in the second half as the momentum of the liquid metal is absorbed in helping to compress the working gas. In other words the liquid metal column is slowed down and stopped by a gas cushion rather than having the flow of liquid metal stopped by the head of the containing vessel to dissipate its kinetic energy.

8. Inlet and exhaust valves have been eliminated and apart from some simple check valves there are no valves working in hot gas.

9. By an arrangement of check valves the working fluid when entering either the hot or cold regions of the working space is injected into liquid metal and when leaving is drawn off from above the liquid metal surface. This maximizes the rate of heat transfer to and from the gas and thus maximizes power output and also increases efficiency by maintaining near isothermal compression and expansion conditions.

Also, an arrangement of ball valves in the pipes conveying conducting fluid metal between the secondary and tertiary chambers causes liquid metal to be drawn from the bottom of the secondary chamber during entry of the working fluid where it has been cooled by coils containing a circulating cooling medium and then sprayed into the working fluid above the liquid metal surface during compression (but not discharge). This assists the rate of heat transfer and contributes to maintaining near isothermal conditions during the processes of expansion and compression.

10. The possibility of gas leakage has been eliminated as has the possibility of lubricant seeping into the working spaces if the option of using MHD units as pumps in place of the pistons is employed. If a mechanical pumping arrangement is used lubricant is required for the mechanical parts including the pistons 43 driving the cold conducting fluid metal columns. This lubrication can be provided by a layer of mineral oil between the head of the piston and the liquid metal which would also acts as a seal to isolate the conducting fluid from outside agents.

Oil will seep past the piston rings causing the cold heat exchange fluid to migrate but this can be regularly adjusted by forcing the oil back into place using a small eccentric operated plunger pump operating between the head and the back of the piston.

11. Containment material requirements are well known from the use of liquid sodium and potassium as heat transfer agents in the nuclear power industry and are not onerous. Construction is simple, consisting largely of plumbing and preliminary calculations based on liquid lithium at 1073° K. indicate a thermal efficiency of 48% before systems losses which is 66% of Carnot effeciency, the theoretical maximum possible for any heat engine operating between similar temperature limits.

It should be appreciated that the scope of the present invention need not be limited to the particular scope of the embodiment described above.

I claim:

1. A magnetohydrodynamic generator comprising a pair of primary chambers for containing a quantity of conducting fluid comprising a liquid metal, a heat source for heating said conducting fluid, said primary chambers being interconnected at their lower ends by a channel incorporating a magnetohydrodynamic cell, a separate source of gaseous working fluid connected to said primary chamber through a heat regenerator for introducing said working fluid into the conducting fluid at an intermediate position spaced from said lower end and below the level of the conducting fluid, means for commencing the introduction of said working fluid into said conducting fluid when the level of conducting fluid in the primary chamber approaches its maximum and during the descent of that level, means for exhausting said working fluid from the primary chamber from above the level of the conducting fluid, means for cooling and compressing the working fluid exhausted from said primary chamber for subsequent injection into said primary chamber, said heat regenerator extracting heat from said exhausted working fluid and heating said working fluid prior to its injection into the primary chamber.

2. A magnetohydrodynamic generator as claimed at claim 1 wherein said working fluid comprises a substantially inert gas.

3. A magnetohydrodynamic generator as claimed at claim 2 wherein said working fluid comprises helium.

4. A magnetohydrodynamic generator as claimed at claim 1 wherein the source of working fluid for each primary chamber comprises a secondary chamber containing a heat exchange liquid and means to vary the volume of conducting liquid in said secondary chamber to inject and exhaust the working fluid to and from the primary chamber.

5. A magnetohydrodynamic generator as claimed at claim 4 wherein cooling means is provided to extract heat from the heat exchange.

6. A magnetohydrodynamic generator as claimed at claim 5 wherein each secondary chamber is connected to a tertiary chamber for the transfer of conducting liquid therebetween and each tertiary chamber is of variable volume wherein the variation in volume of each tertiary chamber is 180° out of phase with the other tertiary chamber.

7. A magnetohydrodynamic generator as claimed at claim 6 wherein said each tertiary chamber is cylindrical and slidably and sealingly supports a piston reciprocating in the tertiary chamber to vary the volume thereof.

8. A magnetohydrodynamic generator as claimed at claim 4 wherein said secondary chambers are interconnected by a channel for transferring the conducting liquid therebetween and said channel accommodates a second magnetohydrodynamic cell, the electrodes of said second magnetohydrodynamic cell being powered from the first magnetohydrodynamic cell to produce the variation in volume of the conducting liquid in the secondary chamber.

9. A magnetohydrodynamic generator as claimed at claim 1 wherein two pairs of primary chambers are provided at the space above the level of conducting fluid in the primary chambers interconnected through a set of pressure differential valves, said pressure differential valves opening on a predetermined maximum gaseous pressure in a primary chamber for releasing working fluid therefrom and introducing the released working fluid into the primary chamber having the least gaseous pressure.

10. A magnetohydrodynamic generator as claimed at claim 9 wherein the flow of working fluid between the primary chambers through said pressure differential valves is such as to ensure a sinusoidal variation in the velocity of the conducting fluid flowing through the magnetohydrodynamic cell.

11. A magnetohydrodynamic generator as claimed at claim 9 wherein the predetermined pressure at which said pressure differential valve opens is variable in accordance with the operational requirements of the generator.

12. A magnetohydrodynamic generator as claimed at claim 1 wherein the passageway through said magnetohydrodynamic cell is divided by partitions perpendicular to the magnetic field and parallel with the fluid flow, said partitions being electrically insulated from the conducting fluid and formed of a material having a high magnetic permeability, separate pairs of magnetohydrodynamic electrodes being provided in the flow space provided by said partitions.

13. A magnetohydrodynamic generator as claimed at claim 12 wherein the partitions are permanently magnetised.

14. A magnetohydrodynamic generator as claimed at claim 12 wherein the conducting fluid in said channel is cooled at either side of the magnetohydrodynamic cell.

15. A magnetohydrodynamic generator as claimed at claim 14 wherein the lower end of such primary chamber is thermally insulated from the heat source.

16. A magnetohydrodynamic generator as claimed at claim 14 wherein a closed cylindrical member is slidably received in the channel to each side of the magnetohydrodynamic cell.

* * * * *